3 Sheets—Sheet 1.

J. G. SMITH.
Stove.

No. 209,721.                    Patented Nov. 5, 1878.

WITNESSES
Robt Evratt,
James J. Sheehy.

INVENTOR.
James G. Smith.
By Gilmore, Smith & Co.
ATTORNEYS.

3 Sheets—Sheet 2.

J. G. SMITH.
Stove.

No. 209,721. Patented Nov. 5, 1878.

WITNESSES
Robert Everett
James J. Sheehy

INVENTOR.
James G. Smith.
By Gilmore, Smith & Co.
ATTORNEYS.

3 Sheets—Sheet 3.
J. G. SMITH.
Stove.
No. 209,721. Patented Nov. 5, 1878.
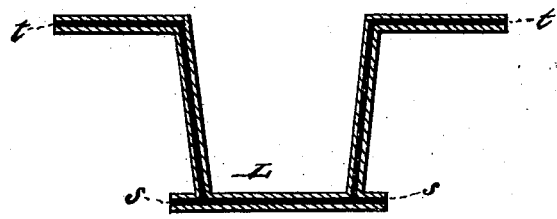
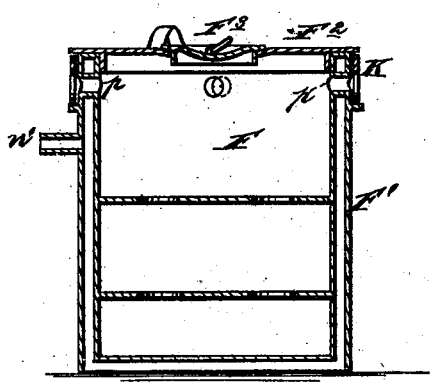
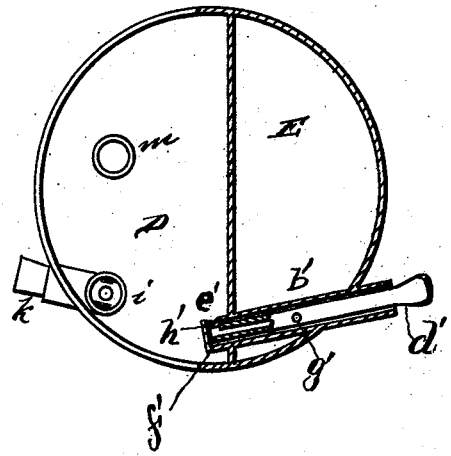
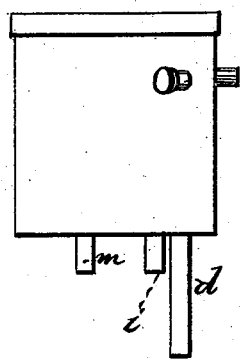
WITNESSES
Robert Everatt
James J. Sheehy
INVENTOR
James G. Smith
By Gilmore Smith & Co.
ATTORNEYS.

UNITED STATES PATENT OFFICE.

JAMES G. SMITH, OF CHAGRIN FALLS, OHIO.

IMPROVEMENT IN STOVES.

Specification forming part of Letters Patent No. 209,721, dated November 5, 1878; application filed August 31, 1878.

*To all whom it may concern:*

Be it known that I, JAMES G. SMITH, of Chagrin Falls, in the county of Cuyahoga and State of Ohio, have invented a new and valuable Improvement in Stoves; and I do hereby declare that the following is a full, clear, and exact description of the construction and operation of the same, reference being had to the annexed drawings, making a part of this specification, and to the letters and figures of reference marked thereon.

Figure 1:
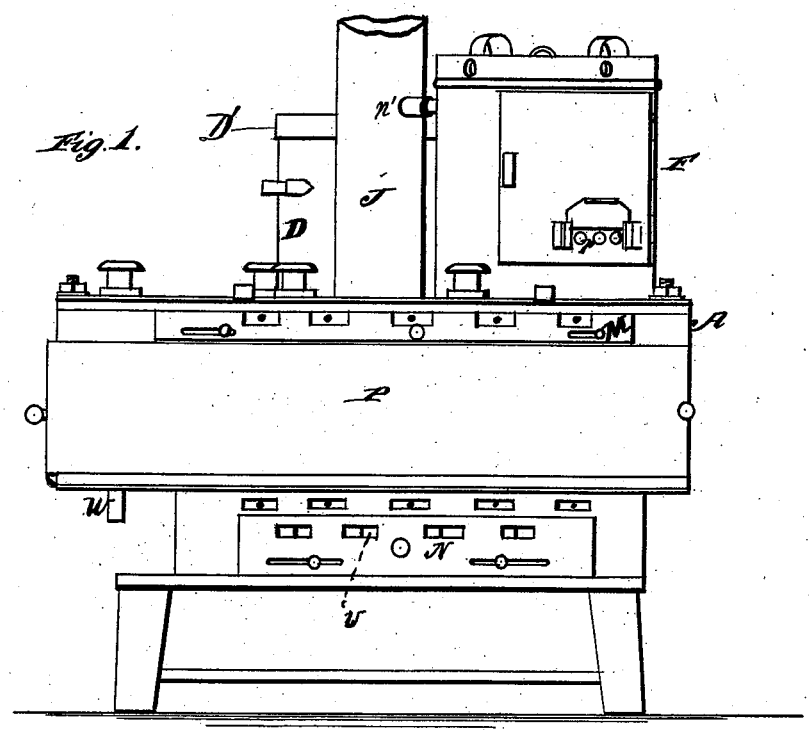
Figure 2:
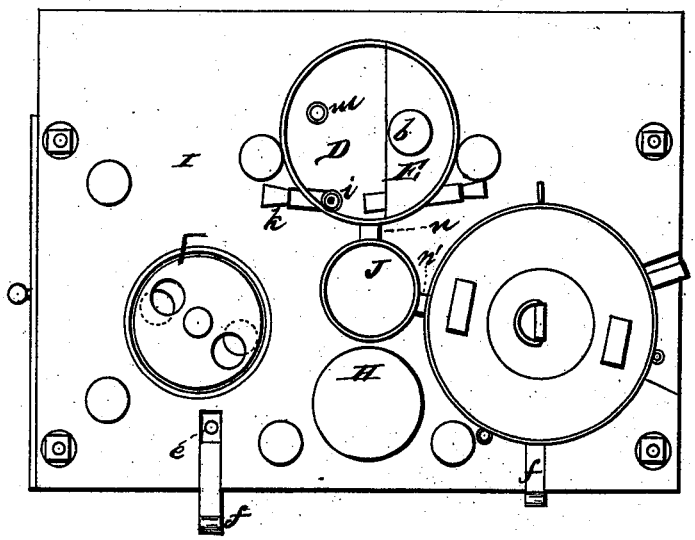
Figure 3:
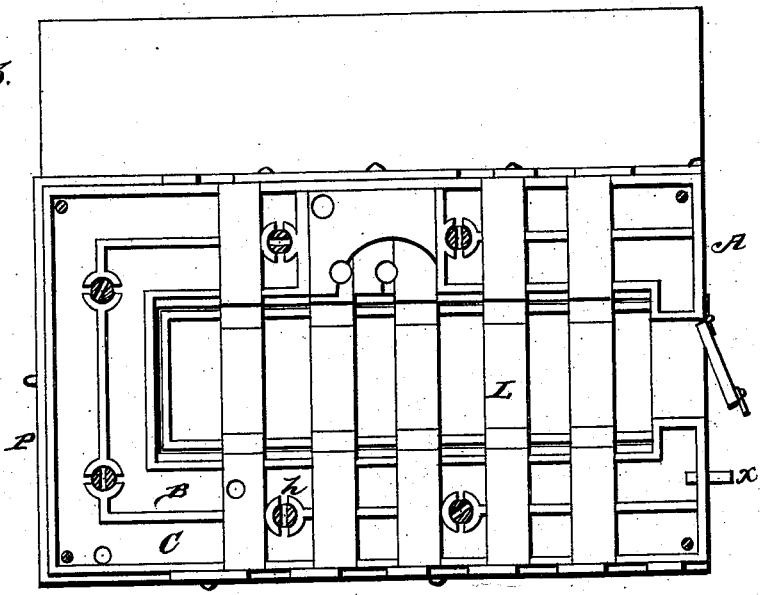
Figure 4:
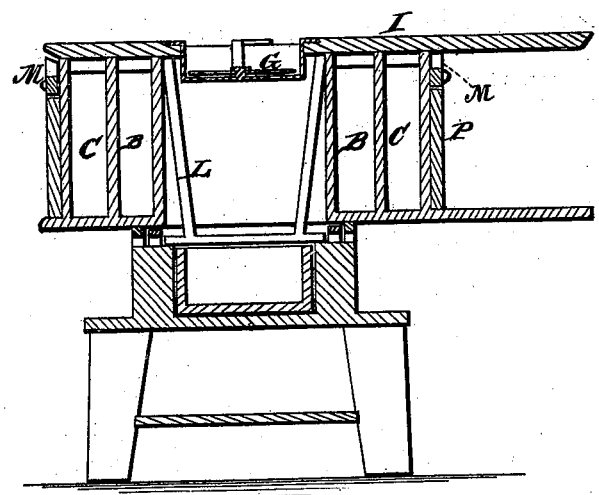

Figure 1 of the drawings is a representation of a side elevation of my stove, and Fig. 2 is a top-plan view of the same. Fig. 3 is a plan view with the top removed. Fig. 4 is a transverse central sectional view. Fig. 5 is a sectional view of the grate-bar. Fig. 6 is a sectional view of the oven. Fig. 7 is a plan view, partly in section, of the reservoir E; and Fig. 8 is a side elevation of the same.

The nature of my invention consists in the construction and arrangement of a heating and cooking stove, with utensils for the same, as will be hereinafter more fully set forth.

The annexed drawings, to which reference is made, fully illustrate my invention.

A represents the stove proper, which may be of any desired shape. B is a steam-generating reservoir, surrounding the fire-box. C is another reservoir or steam-heating chamber, surrounding the reservoir B. These two reservoirs extend entirely around the fire-box, except where the door is for the fire-pot. D is a receiving, furnishing, and condensing reservoir. E is a self-feeding and self-regulating reservoir. F is a combination bake-oven and winter heater.

G is a revolving heat-regulating stove-register, set into the top plate of the stove, for regulating the amount of heat passing under the cooking and heating utensils placed over it, said register consisting of two equal parts, having corresponding openings, and one made to revolve upon the other by means of a center pivot, by which the openings may be closed or opened.

H is a lid in the stove-top, which may be used for filling in water into the steam-generating reservoir B, and also serves as a safety-valve against the too high pressure of steam.

I I represent shelves, continuous with the top and bottom of the stove, for storage and part support for the upper reservoirs, D and E.

The receiving-reservoir and the self-feeding and self-regulating reservoir E are made in one vessel, having a removable cover, D'.

A tube, $b'$, opening outside of the vessel in which the reservoirs D and E are made, passes through the reservoir E and into the reservoir D, where it is perforated at $e'$. This tube $b'$ is perforated directly over $g'$ in the reservoir E, and has communication on its under side with the pipe $d$, extending down into the generating-chamber B, and is provided with a sliding plug, $d'$. This plug is hollow, as shown at $f'$, for a portion of its length, the hollow portion terminating at the perforation $g'$ in said plug.

A small slot, $h'$, is made in the end of the plug $d'$, in order that the plug may be operated to open and close communication between the reservoir D and the tube $b'$, and also at the same time open and close communication between the tube $b'$ and reservoir E.

The reservoir D is filled with water, but not above the tops of the pipes or tubes $m$ and $i$ in said reservoir. E is an air-tight reservoir, and the cap $b$ should be removed to permit the air to escape therefrom and the water to flow through $b'$ from D to E, and the cap $b$ again replaced. Communication should at this time be closed between D, E, and B, by turning plug $d'$ in the tube $b'$.

The generator B is fed automatically from the reservoir E through the pipe $d$ in the following manner: The receiving-reservoir D is first filled with water by removing cover D', which flows through pipe $b'$ into E, as before described. The plug $k$ is turned to close the vent $i$, and the plug $d'$ to open communication between E and B through $b'$ and $d$, and to close communication between D and E through $b'$, when the water will flow from E through $d$ to B until the water in B is level with the lower end of the pipe $d$. The water as it leaves E produces a vacuum in the upper part of E, and the water from E ceases to flow as soon as the lower end of the pipe $d$ is closed by the water in the reservoir B rising against it. After the generator B has been once filled to this height in this manner, the water is kept from falling to any appreciable distance below the end of the pipe $d$ by reason of the fact that as soon as the water boils below the end of the pipe $d$ air will enter it and ascend to the vacuum in E, and cause the water to again flow through $d$ until the end of the pipe $d$ is again covered and the air shut out, and this operation will be repeated as frequently as the water boils away from the lower end of the pipe $d$, thereby producing the self-feeding and self-regulating reservoir E.

The generating-reservoir B furnishes steam for cooking and heating purposes. By means of sliding plates $f$, apertures $e$ are uncovered for the connection of tubes to conduct the steam into any one or more cooking or heating utensils, as desired. The steam is also conducted and equally distributed for winter use into the heating-chamber C by the connecting-cocks $h$ $h$, made to shut off the steam or pass it into the chamber C at will. The water in the generating-reservoir B, which surrounds the fire-box except at the door, is readily converted into steam of great intensity for cooking and heating; and the fire-box, being surrounded by water, shuts off the heat in summer, and by shutting off the steam from the heating-chamber C a double protection is given against the heating up of rooms. It may also be changed from a summer stove to a winter heater, by simply changing the length of the conducting or feed tube $d$, shortening it to nearly the top of the reservoir for summer use, and lengthening it to nearly the bottom of the reservoir for winter use, in which case the outside chamber and tubes may be dispensed with, if desired.

$i$ is a conducting-tube, passing the steam from the generating-reservoir B, when not used in cooking or heating the chamber, into the upper reservoir, D, to be condensed, said tube being provided with a stop-cock, $k$, for shutting off the steam when desired.

$m$ is a conducting-tube, passing the steam from the heating-chamber C into the upper reservoir, D, to be condensed, thus forming a steam-draft and relieving the chamber of dead steam, and what might otherwise become partially condensed and cooled by remaining in contact with the outside.

The reservoir D is, by a pipe, $n$, connected with the stove-pipe J, for conducting off what steam might not be condensed in said reservoir.

F, &c., Figs. 1 and 6, represent an oven not claimed in this application, but shown in connection with the stove.

The fire-pot of the stove, containing the ash-pan, is made to stand upon legs, while the stove stands upon the fire-pot.

L represents a grate not claimed in this application.

The fire-pot is also provided with openings $v$ on the sides, made to open or close by means of sliding plates N, said openings communicating with the interior of the stove by the openings between the lower part of the grates, for loosening up the fuel and giving greater draft when desired.

There is an opening, $w$, at the bottom of the steam-heating chamber C, closed by the plate O, for drawing off the water, if any, that may form from the condensation of the steam in the bottom of the chamber.

At the lower part of the stove is an opening, $x$, leading into the steam-generating reservoir B, for inserting a faucet, by which a supply of boiling water is always at hand, doing away with the use of tea-kettles. The outside of the stove (or outside reservoirs) is surrounded by wooden bars or casing P, which more effectually cut off the heat in the summer, and said bars or casing are removed for winter use.

The reservoir B being kept full of water in the summer, and no steam admitted into the chamber C, there can be no danger of the wooden casing becoming heated or taking fire, while it effectually cuts off all the heat from the outside.

I do not broadly claim a stove having its fire-box surrounded by a water-reservoir, as this is already shown to be old in the patent to Getz, October 4, 1859.

I reserve the right to make separate applications for the oven and for the grate shown herein.

Having thus fully described my invention, what I claim as new, and desire to secure by Letters Patent, is—

1. A stove, A, having its fire-box surrounded by a steam-generating reservoir, B, and this reservoir surrounded by a steam-heating chamber, C, the two being connected by a tube having stop-cock $h$, as and for the purposes herein set forth.

2. A stove, A, having its fire-box provided with a surrounding steam-generating reservoir, B, a steam-heating chamber, C, surrounding the reservoir, and a removable wooden casing, P, inclosing the whole, substantially as and for the purposes herein set forth.

3. The combination of the receiving-reservoir D, the self-feeding reservoir E, with vent $b$, and the connection $b'$, as and for the purposes herein set forth.

4. The combination of the generating-reservoir B, surrounding the fire-box of the stove A, the reservoir E, cocks $h$, and the feed-pipe $d$, substantially as and for the purposes herein set forth.

5. The connecting-cocks $h$ $h$, in combination with the steam-generating reservoir B and surrounding heating-chamber C, for the purposes herein set forth.

6. The conducting-tubes $i$ and $m$, in combination with the reservoirs D and B and chamber C, for the purposes herein set forth.

In testimony that I claim the above I have hereunto subscribed my name in the presence of two witnesses.

JAMES GREGORY SMITH.

Witnesses:
ALEXANDER GILES,
IRIS C. SMITH.